Nov. 25, 1947.                H. H. MAXIM                    2,431,410
                                SNOW PLOW
                             Filed May 5, 1945
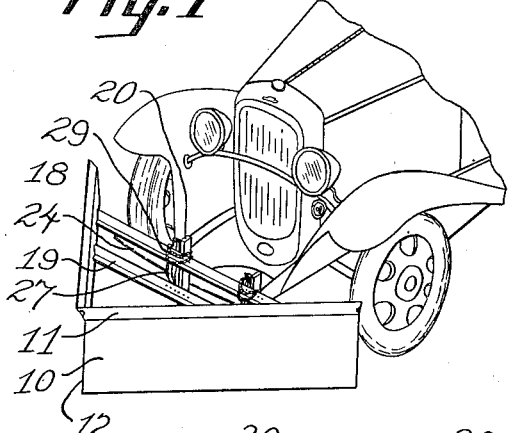
Fig. 1
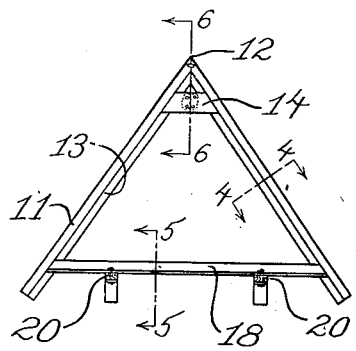
Fig. 2
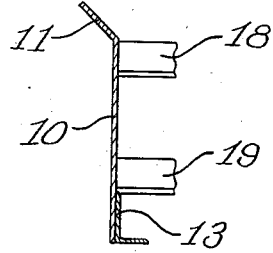
Fig. 4
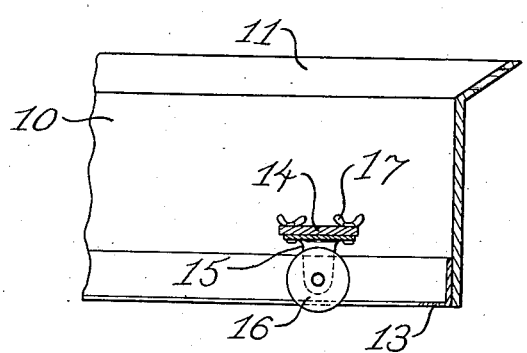
Fig. 3
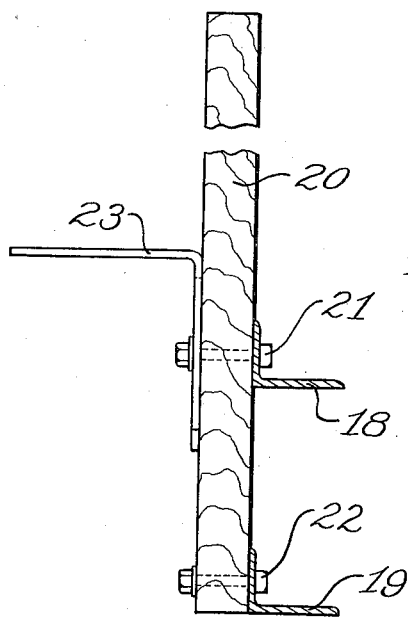
Fig. 5
Fig. 6
INVENTOR
HIRAM H. MAXIM
BY Chapin & Neal
ATTORNEYS Patented Nov. 25, 1947

2,431,410

UNITED STATES PATENT OFFICE 2,431,410

SNOWPLOW

Hiram H. Maxim, Hartford, Conn., assignor to The Maxim Silencer Company, Hartford, Conn., a corporation of Connecticut Application May 5, 1945, Serial No. 592,139

2 Claims. (Cl. 37—44)

This invention relates to snow plows, and has particular reference to plows which can readily be attached when needed to the bumper of ordinary automobiles. While many forms of snow plows have been devised for attachment to vehicles such as trucks there have been as far as I am aware no plows which are capable of such ready attachment to a pleasure automobile as to permit their use for such relatively short tasks as plowing out a driveway. In order to make a plow suitable for this purpose it is necessary that the speed and ease with which it may be attached to the front of an automobile is such as will not deter the user from employing the plow. A further object of the invention is to provide a plow which will adjust itself to the movement of the automobile and to irregularities in the driveway surface without damaging either the automobile or the driveway.

This invention will now be described with reference to the accompanying drawings, in which Fig. 1 is a perspective view showing the plow attached to the front bumper of the automobile;

Fig. 2 is a plan view of the plow;

Fig. 3 is a rear view of the plow;

Fig. 4 is a section on line 4—4 of Fig. 2 on an enlarged scale;

Fig. 5 is a section on line 5—5 of Fig. 2 on a still larger scale; and

Fig. 6 is a section on line 6—6 on Fig. 2 on an enlarged scale.

The plow consists of two identical plates or moldboards 10, each having the top flared outwardly as at 11. The plates are welded together at 12 and have secured to their bottom edges angle irons 13 which accomplish the double purpose of reinforcing the plates against buckling and of acting as runners which decrease the resistance of the plow to sliding and prevent it from digging into the driveway. The angle irons are preferably also welded to each other adjacent point 12. Near the front of the plow is welded a cross-piece 14 to which is secured the support 15 of a caster 16 which may be of the customary swiveling type if desired. The support 15 is preferably held to the plow by some detachable means as wing nuts 17 so that the caster may be removed when desired to permit close scraping of hard surfaced roads. When in use the caster reduces the force necessary to push the plow and prevents the nose of the plow from digging into soft surfaced roadways.

At the rear of the plow two vertically separated angle irons 18 and 19 are welded so as to form struts holding the plates 10 apart at the desired angle. A pair of spaced wooden abutment members 20 are bolted at 21 and 22 to the angles and each carries an angle member 23 adapted to project underneath the front bumper 24 of the automobile. Bolts 21 and 22 pass through any of a series of holes 25 and 26 formed respectively in the angles 18 and 19 so that the abutments 20 may be shifted laterally of the plow to lie adjacent the horns 27 which are customarily found on the front bumper to prevent interlocking with other cars. The angle 23 is provided with a slot 28 through which the bolt 21 passes so that its height may be adjusted. In operation the abutments 20 are adjusted so that they lie closely adjacent the horns 27 of the bumper 24 to which the plow is to be attached, and the angles 23 are adjusted so that they lie underneath the bumper not too snugly. Their function is merely to prevent the rear end of the plow rising up due to resistance of the snow, and some freedom of motion of the rear end of the plow should be permitted. The abutments 20 are preferably secured loosely to the members 27 by chains 29 which are merely wound around the adjacent abutment 20 and member 27 and are then hooked together at their ends so that they cannot unwind. A tight connection at this point is undesirable and the loose chain connection or its equivalent permits sufficiently free play between the members 20 and 27 to adjust for unevenness in the travel of the automobile and in the surface of the driveway. At the same time it provides sufficient rigidity to enable the plow to be steered and to push snow sideways even where one side only of the plow is used. The simplicity of the attachment, and the fact that no equipment needs to be added to the automobile to enable it to receive the plow, should be noted.

I claim:

1. A snow plow for attachment to the bumper of an automobile comprising a pair of moldboards secured together in V-formation, said moldboards having their upper portions bent outwardly, runners upon the lower edges of the moldboards, a castor arranged adjacent the apex of the V to support the front of the plow slightly above the road surface, a cross brace structure connecting the moldboards to keep them in angular formation, spaced substantially vertical, laterally adjustable abutments coupled to said cross brace structure in position to engage directly the front of automobile bumpers of varying heights, and means engaging said abutments and the exterior of the bumper to hold said cross brace structure in pushing relation to the bumper, said means including positive stop means for engaging the under side of the bumper to limit upward movement of said abutments relative to the bumper.

2. A snow plow for attachment to the bumper of an automobile comprising a pair of moldboards secured together in V-formation, said moldboards having their upper portions bent outwardly, runners upon the lower edges of the moldboards, a cross brace structure connecting the moldboards to keep them in angular formation, spaced substantially vertical, laterally adjustable abutments coupled to said cross brace structure in position to engage directly the front of automobile bumpers of varying heights, and means engaging said abutments and the exterior of the bumper to hold said cross brace structure in pushing relation to the bumper, said means including positive stop means for engaging the under side of the bumper to limit upward movement of said abutments relative to the bumper.

HIRAM H. MAXIM.

REFERENCES CITED

The following references are of record in the file of this patent:

UNITED STATES PATENTS

| Number | Name | Date |
|---|---|---|
| 2,103,900 | Gay | Dec. 28, 1937 |
| 2,188,805 | Borgeson | Jan. 30, 1940 |
| 2,333,360 | Churchill | Nov. 2, 1943 |
| 2,333,361 | Churchill | Nov. 2, 1943 |